United States Patent [19]

Hasegawa

[11] 3,922,372
[45] Nov. 25, 1975

[54] PROCESS FOR THE PRODUCTION OF FISH FLOUR HAVING GEL-FORMING ABILITY

[75] Inventor: Yoshisuke Hasegawa, Sapporo, Japan

[73] Assignee: Mitsubishi Corporation, Tokyo, Japan

[22] Filed: Mar. 5, 1975

[21] Appl. No.: 555,631

Related U.S. Application Data

[63] Continuation-in-part of Ser. No. 246,972, April 24, 1972, abandoned.

[30] Foreign Application Priority Data

Apr. 22, 1971 Japan.............................. 46-25669

[52] U.S. Cl.................................. 426/574; 426/643
[51] Int. Cl.²........................................... A22C 25/00
[58] Field of Search..................... 426/573, 574, 643

[56] References Cited
UNITED STATES PATENTS

| | | | |
|---|---|---|---|
| 3,264,116 | 8/1966 | Gray | 426/643 X |
| 3,408,210 | 10/1968 | Heyman | 426/643 X |
| 3,529,975 | 9/1970 | Gray | 426/643 |
| 3,707,381 | 12/1972 | Sharp | 426/643 |

*Primary Examiner*—A. Louis Monacell
*Assistant Examiner*—R. A. Yoncoskie
*Attorney, Agent, or Firm*—Lane, Aitken, Dunner & Ziems

[57] ABSTRACT

Fish flour, having an ability to form a gel (fish meat paste) similar to that formed from minced uncooked fish meat, is obtained by preparing a sol from salt-free fish meat of low fat content containing an oligosacharide or sugar alcohol and a fatty acid ester, adjusting the pH of the resultant sol to a value slightly more alkaline than the isoelectric point of the proteins contained therein, and then subjecting the sol to instantaneous spray-drying. When the fish flour thus obtained is mixed with 4–5 times its weight in water and about 3% by weight salt, milled and heated, the result is a gel product very similar to that obtained from fresh minced uncooked fish meat. The fish flour retains its gel-forming ability even after prolonged periods of storage.

8 Claims, No Drawings

PROCESS FOR THE PRODUCTION OF FISH FLOUR HAVING GEL-FORMING ABILITY

CROSS-REFERENCE TO RELATED APPLICATION

The present application is a continuation-in-part of our copending application Ser. No. 246,972, filed Apr. 24, 1972, now abandoned and entitled A PROCESS FOR THE PRODUCTION OF FISH MEAT POWDER RETAINING FRESH MEAT PROPERTIES and claims the priority of Japanese application No. 25669/1971, filed Apr. 22, 1971.

FIELD OF THE INVENTION

The present invention relates to a process for the preparation of fish flour capable of forming a fish meat protein gel or paste of high jelly strength.

When a fish meat sol (a mixture of ground fish meat, salt and water) is heated, the sol is converted into a gel having a ternary network structure. The gelled structure provides the fish meat paste with elasticity, the measure of which is known as "jelly strength". Fish meat sols coagulated or gelled by heating form the fish meat paste known as "KAMABOKO". Thus, the term "gel-forming ability" as used herein, refers to the ability to form a gel product having jelly strength comparable to that of a gel product obtained from minced fresh fish meat, when the fish flour is admixed and kneaded with a suitable amount (4–5 times its weight, generally) of water and about 3% by weight (based on the weight of fish meat) salt to form a sol and then heated. Furthermore, the term "gel-forming ability" also refers to the ability to exhibit the activity of adenosine triphosphatase (ATPase), this activity being similar to that of minced fresh fish meat, when adenosine triphosphate (ATP) is added to a sol made from the fish flour product.

BACKGROUND OF THE INVENTION

A process for preparing fish flour having a high protein content has recently been developed which process involves treating minced uncooked fish meat with an organic solvent such as isopropyl alcohol and drying the thus treated fish meat to form a fish flour (this flour is referred to as a Fish Protein Concentrate). However, a gel product can not be obtained from such a fish flour because the fish flour is deprived of its gel-forming ability by the organic solvent treatment.

Sharp, U.S. Pat. No. 3,707,381, discuses a process for preparing a dry protein concentrate having high biological value by mincing fresh fish meat, soaking the minced fish meat in an aqueous solution containing 0.01 to 1.0% by weight of formaldehyde and forming a slurry therein and then drying the slurry. However, we have found that the test of the dry protein concentrate revealed that said concentrate did not exhibit the gel-forming ability in reference to a sample prepared by conducting extraction with isopropanol, and that said concentrate did not essentially exhibit gel-forming ability in reference to a sample prepared without the extraction being conducted, even immediately after preparation. As will be apparent from the foregoing, the dry protein concentrate obtained by Sharp's process does not retain the gel-forming ability, although it does have high biological value showing a nutritive protein value.

It has also been proposed to prepare a fish flour having gel-forming ability by forming a sol of fresh uncocked fish meat and immediately freeze-drying the sol. However, the freeze-drying process is unsatisfactory because the fish flour obtained thereby retains its gel-forming ability only for about 72 hours after preparation and obviously must be used soon after preparation in order to form a suitable gel or paste.

BRIEF SUMMARY OF THE INVENTION

It has now been discovered that retention of the gel-forming ability in fish meat is based on the stability of the hydrogen bondings existing in intra and inter polypeptide chains of fish meat protein molecules, i.e., the fact that these hydrogen bondings are protected from cleavage. This finding has led to the discovery that the hydrogen bondings in fish meat protein molecules may be protected and stabilized by converting the fish meat into a sol in the presence of an oligosaccharide or a surgar alcohol and a fatty acid ester, and that, in the case, the stability is retained without being affected by the spray-drying process of such fish meat sol.

Furthermore, it has been discovered that loss of water-soluble proteins, i.e., myoalbumin, myogen and globulin, during spray-drying can be effectively prevented by adjusting the pH of the sol to a value slightly more alkaline than the isoelectric point of the proteins contained therein, thereby reducing the solubility of these proteins.

Therefore, the present invention includes the steps of adding a fatty acid ester and a member selected from the group consisting of oligosaccharides and sugar alcohols to fresh uncooked fish meat to form a mixture; milling the mixture to produce a sol; adjusting the pH of the sol to a value slightly higher than the isoelectric point of the proteins contained in the fish meat; and spray-drying the sol to produce the fish flour.

The additives and pH control of the present invention serve to protect and stabilize the fish meat protein against denaturation during all stages of conversion to a fish meat powder or "flour" and also during storage over prolonged periods of time.

Accordingly, one of the objects of the present invention is to provide a fish flour which retains its gel-forming ability over prolonged periods of storage.

Other objects of the present invention will become clear from a reading of the ensuing description, taken in conjunction with the appended claims.

DETAILED DESCRIPTION OF THE INVENTION

The fish meats used in the process of the present invention are preferably fresh uncooked fish meats of low fat content (less than about 6% by weight). For example, the meat of pollack, eleginus and cattle fish may be used to advantage. The starting fish meat is preferred to be as fresh as possible. However, frozen fish meat may also be used, provided that the fish was frozen while fresh. However, the use of salt-added fish meat should be avoided.

The raw fish meat, after being separated from fish bodies, is fully bleached in water, drained, cut into small pieces, and then processed in a colloid-mill to prepare a sol.

Oligosaccharides which may be added to the fish meat sol of the present invention include monosaccharides such as glucose or fructose and disaccharides such as cane sugar. Suitable sugar alcohols include sorbitol, xylitol and mannitol. Fatty acid esters suitable for addition to the sol include, for example, fatty acid esters of cane sugar, fatty acid esters of sorbitol, fatty acid monoglycerides and the like. The preferred fatty acid components of such esters include oleic, palmitic and stearic acids. Also, it is preferred that the alcohol component of the ester be the same as the free oligosaccharide or sugar alcohol used in admixture. The oligosaccharide or sugar alcohol and the fatty acid ester may be added at any time during the process or steps leading to the sol, but are generally added to the colloid-mill during the sol-forming step.

The amounts of these additives are not critical. However, the oligisaccharide or sugar alcohol may suitably be used in an amount of about 5% by weight based on the brayed fish meat, and the fatty acid ester is preferably used in an amount of about 0.1–0.2% by weight, again based on the weight of the brayed fish meat.

The hydroxyl groups of the oligosaccharide or sugar alcohol, within the fish meat sol, function as polar groups, and the hydration caused thereby controls the free movement of the protein particles in the sol. The fatty acid ester within the meat sol possesses surface activating properties and functions as a protective agent for the colloidal particles in the sol (i.e., as a surfactant). The hydrophilic groups (OH) and the hydrophobic groups (alkyl) of the fatty acid ester become coordinated respectively with the hydrophilic groups OH, SH, $-NH_2$, $-COOH$ and the like) and hydrophobic groups both existing on the surface or between the protein fibers of the colloidal fish meat particles, and thus protect the hydrogen bondings of the intra-and interpolypeptide chains of the fish meat proteins against cleavage. Thus, the fatty acid ester is thought to inhibit the denaturation of the proteins that might otherwise occur during the process of converting the fish meat into a sol. Moreover, the above described coordination on the protein fibers which exist in the fish meat sol is thought to contribute in large part to the preservability of the powdered product prepared from the fish meat sol.

The pH of the fish meat sol, prepared as described above, is then adjusted to a value slightly higher (slightly more alkaline) than the isoelectric point of the proteins in the sol. This adjustment of pH to the isoelectric point of the proteins serves to lower the solubility of the proteins contained in the sol and further, to suppress the unpleasant odor which otherwise results from a very small amount of free diamines and triamines which may be produced in the course of the spray-drying of the fish meat sol. The pH value of the starting or raw fish meat varies to some extent depending on the freshness of fish. Pollack meat, for example, generally has a pH value of 6.8–7.1 and its pH may be adjusted to about 6.4–6.6 by the addition of a very small amount of a non-toxic organic acid, such as a dilute aqueous solution of acetic acid or citric acid. In adjustment of the pH value of the fish meat sol, care should be taken so that the adjusted pH value is slightly more alkaline than the exact isoelectric point, because if the final pH is more acidic than the isoelectric point, coagulation of the proteins may take place. In practice, the pH should be adjusted to a value within a range of from the isoelectric point to a pH of 0.5 above the isoelectric point.

The reason why the presence of salt in the starting fish meat is undesirable is that it solubilizes the salt-soluble proteins contained in the sol. For this reason, the use of the starting fish meat containing salt should be avoided. This should be kept in mind particularly in the event frozen fish is used as starting fish meat.

After pH adjustment, the fish meat sol is subjected to spray-drying to effect pulverization. Before carrying out the spray-drying operation, the solid content of the sol solution may preferably be adjusted to give a viscosity suitable for jet-spraying. In general, a solids content of about 10% and a viscosity of about 20,000 cp are suitable for the spray-drying operation.

In conducting the spray-drying operation of the present invention, the important consideration is that the object to be dried here is protein, which is very unstable to heating and therefore easily becomes denatured due to heat-gel formation if the drying operation is not precisely controlled. Temperatures within the drying apparatus may vary with residence, but it is preferred that the residence time of the fish meat sol in the heating zone of the drying apparatus be instantaneous. Experiments reveal that the denaturation due to heat gel formation in the resulting fish flour will be surprisingly small, if, for example, the feed rate of the sol and the feed rate of hot air are so controlled as to keep the temperature of the hot air entering the drying apparatus as 125°–170°C, the air temperature in the middle of the drying zone at 60–70°C, and the temperature of vented air at 35°–40°C and to control the residence time of the sol in the drying apparatus at 10 seconds or less. When the colloidal fish meat sol is not sufficiently homogeneous at the time the sol is injected into the drying apparatus, the dried particles tend to adhere to the inner walls of the drying apparatus, thus causing heat-gel formation.

The water content of the fish flour product of the process of the present invention is preferably no more than 7% by weight. When the water content in the fish flour exceeds 7%, there is a chance a small amount of self-digestive enzymes remaining in the flour will reactivate allowing denaturation by the action of externally introduced bacteria during storage of the fish flour. This type of bacterial action results in forming lumps of finger tip size, though very small in number. A water content of less than 7% is generally considered to be bound water.

Jelly strength, indicating gel-forming ability, of a fish flour prepared, according to the present invention was determined and the results are shown below. Two portions (a,b) were taken from each of the fish flour samples, immediately after preparation and after storage for various periods of time at a temperature below 15°C. Each sample was separately kneaded in a mill for 15 minutes in the presence of five times its weight in water and 3% by weight salt, shaped to form coatings 2 cm in thickness on plates and heated for gellation at 110°C for 15 minutes. The jelly strength of these preparations was measured. For storage the samples were kept in a sealed bag of a vinyl polymer (e.g., polyvinylchloride).

TABLE 1

| Sample | (a) Water content % | (a) Jelly* strength | (b) Water content % | (b) Jelly* strength |
| --- | --- | --- | --- | --- |
| Immediately after preparation | 6.50 | 505 | 6.72 | 520 |
| 2 Months after preparation | 6.49 | 504 | 6.80 | 515 |
| 4 Months after preparation | 6.49 | 500 | 6.78 | 520 |
| 6 Months after | | | | |

TABLE 1-continued

| Sample | (a) Water content % | Jelly* strength | (b) Water content % | Jelly* strength |
|---|---|---|---|---|
| preparation 8 Months after | 6.42 | 503 | 6.79 | 516 |
| preparation 10 Months after | 6.46 | 500 | 6.80 | 514 |
| preparation | 6.31 | 496 | 6.78 | 515 |

*Grams per square centimeter

As is evident from Table 1, there are no substantial differences in the water contents and jelly strengths as between samples taken immediately after preparation and the samples taken after storage for 10 months.

Thus, it may be appreciated that the gel-forming ability of the fish flour prepared according to the process of the present invention can be preserved over a prolonged period, e.g., as long as 10 months.

The retention of the gel-forming ability during prolonged storage is thought to be due to the fact that the fish flour is an undenatured product which retains the distinctive character (structure and properties) of the protein of fresh uncooked fish meat.

Tests reveal, as shown below (Table 2), that the fish flour of the present invention has ATP ase activity showing the distinctive character of fresh fish meat proteins.

TABLE 2

| Sample | The value of ATP ase activity ($\mu$mol Pl/min/gr flour) a | b |
|---|---|---|
| Immediately after preparation | 36.10 | 36.60 |
| 2 Months after preparation | 36.05 | 36.60 |
| 4 Months after preparation | 36.00 | 36.50 |
| 6 Months after preparation | 36.00 | 35.00 |
| 8 Months after preparation | 32.50 | 34.20 |
| 10 Months after preparation | 31.10 | 34.00 |
| Minced Fresh Fish Meat | 37.82 | |

As seen from the above, it is confirmed that the fish flour prepared according to the present invention has ATP ase activity, very similar to that of fresh uncooked fish meat.

This is a surprise in view of the understanding in the art that dry fish meat must lose the ATP ase activity.

The retention over long periods of time of gel-forming ability (including ATP ase activity) by the fish flour prepared by the process of the present invention is, as previously mentioned, thought to be due to the fact that the hydrophilic groups (OH) and the hydrophobic groups of the sugar alcohol and fatty acid ester, added during the preparation of the sol, are introduced into the fish flour product prepared by the spray-drying of the fish meat sol and are coordinated with the hydrophilic groups and hydrophobic groups existing on the surface of or between the protein fibers in the fish flour, thereby protecting the hydrogen bondings of the intra- and inter-polypeptide chains of the protein molecules and promoting moderate water retainability and moisture content stability during storage.

Thus, the fish flour prepared by the process of the present invention retains gel-forming ability over a long period and therefore is suitable as a starting material for various fish meat pastes and jelly preparations. These fish meat flour products may also be used to increase nutrient value by use as an additive in the preparation of snack foods such as prawn crackers and biscuits.

The following examples serve to illustrate the invention.

EXAMPLE 1

Body parts of pollack (1000 kg.) were washed with water and the meat was collected. After bleaching in water several times, the meat was drained of water and subjected to tendonremoval to give 450 kgs. of brayed fish meat. 450 kg. of the brayed fish meat was mixed with 22.5 kg. of sorbitol and this mixture (containing 81% of water) was divided into lots of 20 kgs. each.

To each of the lots (20 kg.) thus prepared were added 20 g. of the sorbitol fatty ester of oleic acid and 20 g. of a cane sugar fatty acid ester, and each was then placed in a colloid-mill to prepare a sol. The pH of the resulting sol was adjusted to 6.5 by addition of a dilute aqueous acetic acid solution. The concentration (solids content) of the sol was 9%. The sol solution was then fed into a spray-drying apparatus at the rate of 30 liters/hour. The spray-drying operation was effected with an air inlet temperature of 140°C, a temperature at the middle of the drying zone of 60°C, and an outlet air temperature of 38°–40°C with a hot air feed rate of 40 liters/min. To control the denaturation of the sol proteins to as great an extent as possible, it is preferable to introduce cold air into the middle of the heating zone within the drying apparatus.

The above described procedure gave 4.10 kg. of fish flour containing 6.50% of water.

When the fish flour thus obtained was stored in a moisture-proof container, it was found to have retained its gel-forming ability after a lapse of 10 months and could satisfactorily be used as a starting material for various aquatic jelly food preparations.

EXAMPLE 2

Body parts of pollack (1000 kg.) were chopped and washed with water. Bones and skin were removed and the preliminary treatments such as draining and removal of tendon resulted in 450 kg. of minced meat, with which 22.5 kg. of cane sugar was then admixed. The mixture was then divided into lots of 20 kg. each, and each 20 kg. lot of brayed meat was admixed with 20 g. of sorbitol ester of oleic acid and 20 g. of cane sugar ester of oleic acid. The mixture was then placed in a colloid-mill to prepare a sol. The pH of the fish meat sol thus obtained was adjusted to 6.5 by adding a dilute acetic acid solution. The sol concentration (solids content) was adjusted to about 9% and the sol was spray-dried under the following conditions:

| | |
|---|---|
| Feed rate of sol | 30 liters/hour |
| Hot air temperature (at inlet) | 140°C |
| Temperature in the middle of the column | 60°C |
| Vented air temperature | 38–40°C |
| Feed rate of hot air | 40 liters/min. |
| Residence time of the sol in the tower | about 8 seconds |

The drying operation gave 4.10 kg. of a fish flour containing 6.5% water. The fish flour thus obtained was admixed with five times its weight in water and 3% by weight salt, brayed for 15 minutes, shaped and then heated. The appearance and the elasticity of the resulting preparation were very similar to those of a similarly shaped and heated preparation of fresh minced meat.

The fish flour prepared by the above-described process was stored in a thin polyvinyl chloride film container and the water content and jelly strength thereof were measured after 10 months. As shown below, no substantial change was observed even after storage for 10 months.

|  | Water Content | Jelly Strength |
|---|---|---|
| Immediately after the preparation | 6.50% | 505 |
| After storage for 10 months | 6.31% | 496 |

I claim:

1. A process for the preparation of an undenatured fish meat powder having the ability to make a fish meat paste of high jelly strength, said process comprising:
   separating raw fish meat from salt-free fish bodies;
   adding a fatty acid ester and a member selected from the group consisting of oligosaccharides and sugar alcohols to said raw fish meat to form a mixture;
   milling said mixture to produce a sol;
   adjusting the pH of said sol to a value approximating the isoelectric point of proteins contained in the fish meat; and
   spray-drying the sol to produce the fish meat powder.

2. The process of claim 1 wherein said fatty acid ester is a fatty acid ester of said oligosaccharide or sugar alcohol.

3. The process of claim 1 wherein said raw fish meat has a fat content of less than 6% by weight.

4. The process of claim 1 wherein the oligosaccharide is a member selected from the group consisting of glucose, fructose, and cane sugar.

5. The process of claim 1 wherein the sugar alcohol is a member selected from the group consisting of sorbitol, xylitol, and mannitol.

6. The process of claim 1 wherein the fatty acid ester is a member selected from the group consisting of cane sugar fatty acid esters, soribitan fatty acid esters, and fatty acid monoglycerides.

7. The process of claim 1 wherein the spray-drying of the sol is effected by regulating the flow rate of air, heated to a temperature within the range of 125°–170°C, into a drying apparatus so that the temperature within the center of the drying zone is maintained within a range of 60°–70°C and the temperature of the vented air is within a range of 35°–40°C and by regulating the feed rate of the fish meat sol through the drying apparatus so that the residence time of the fish meat sol within the drying zone is seconds or less.

8. The process of claim 1 wherein said pH is adjusted to a value within the range of from the isoelectric point of the fish meat protein to 0.5 greater than the isoelectric point.

* * * * *